Figure 1:
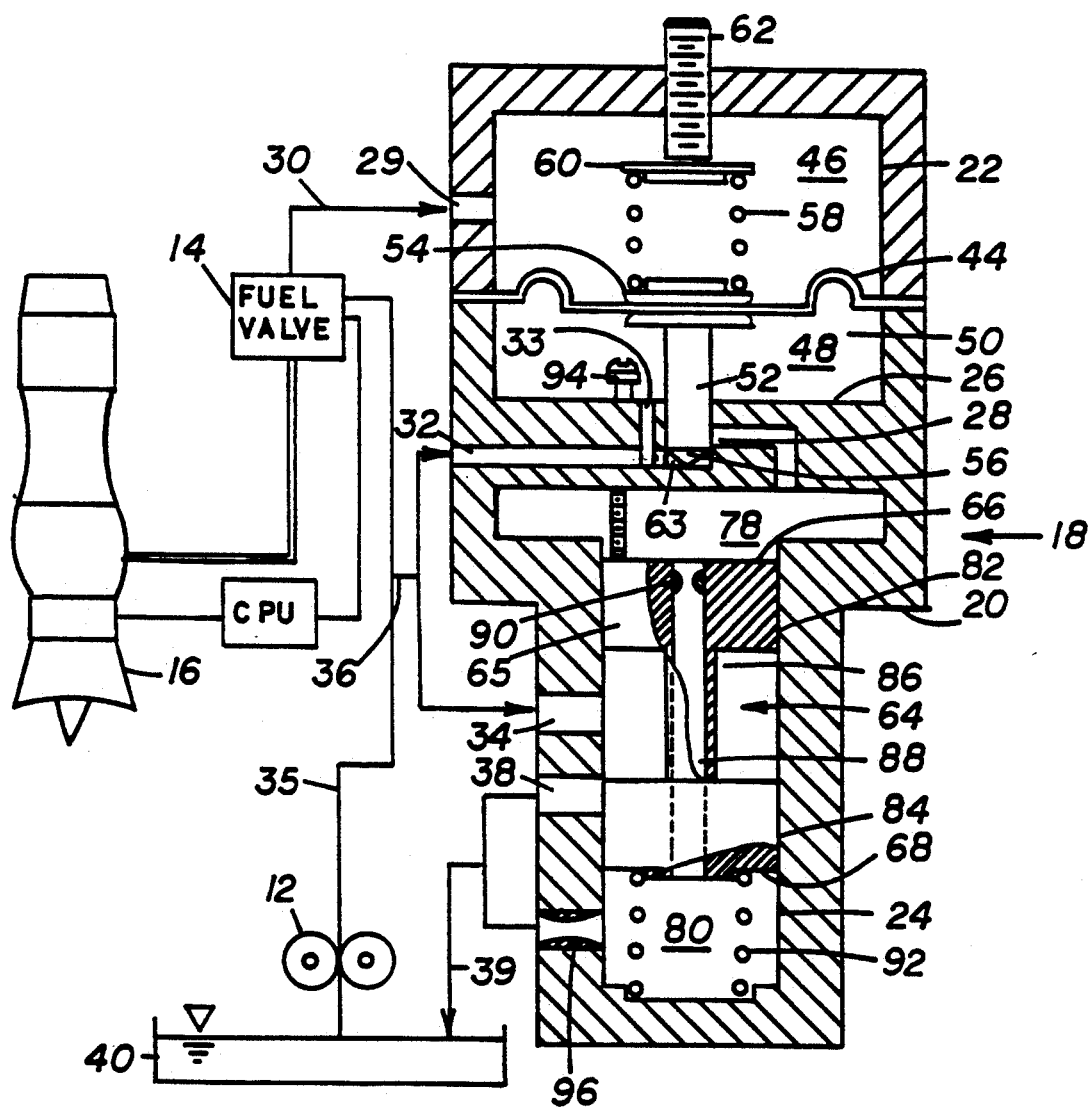

United States Patent [19]

Tran

[11] Patent Number: 5,327,720
[45] Date of Patent: Jul. 12, 1994

[54] DIFFERENTIAL PRESSURE REGULATOR VALVE

[75] Inventor: Hoang V. Tran, Montreal, Canada

[73] Assignee: Allied-Signal Inc., Morristown, N.J.

[21] Appl. No.: 56,640

[22] Filed: May 3, 1993

[51] Int. Cl.$^5$ ............................................. F02C 9/26
[52] U.S. Cl. ............................ 60/39.281; 137/489.5
[58] Field of Search .................. 60/39.24, 39.281, 734; 137/485, 487, 489.5

[56] References Cited

U.S. PATENT DOCUMENTS

| | | | |
|---|---|---|---|
| 3,106,934 | 10/1963 | Rogers et al. | 137/489.5 |
| 4,034,559 | 7/1977 | Dmitriev et al. | 60/39.281 |
| 4,578,945 | 4/1986 | Peck et al. | 60/39.281 |
| 4,805,658 | 2/1989 | Perkinson et al. | 60/39.281 |
| 4,836,089 | 6/1989 | Moore | 91/446 |

*Primary Examiner*—Louis J. Casaregola
*Attorney, Agent, or Firm*—Leo H. McCormick, Jr.; Larry J. Palguta; Robert A. Walsh

[57] ABSTRACT

A regulator valve having a diaphragm which responds to changes in an operational fluid pressure differential by overcoming a first spring and moving a stem of a first spool away from a stop to thereafter allowing a supply fluid pressure to create a regulator-fluid pressure differential across a second spool. The regulator fluid pressure differential overcomes a second spring and moves a cylindrical body of a second spool to position a land and allow supply fluid to freely flow to a reservoir. Flow of supply fluid to the reservoir sequentially reduces the supply fluid pressure to permit the first spring to reposition the stem of the first spool in a wall to terminate communication of the supply fluid pressure to the second spool. A passage in the second spool allows supply fluid pressure to bleed to a reservoir and thereby proportionally reduce the regulator fluid pressure differential. At some regulator fluid pressure differential, the second spring moves cylindrical body of the second spool and positions land to inhibit the flow of supply fluid to the reservoir and establish a predetermined fluid pressure for the supply fluid.

5 Claims, 2 Drawing Sheets

DIFFERENTIAL PRESSURE REGULATOR VALVE

This invention relates to a regulator valve having first and second spools for sequentially responding to changes in an operational fluid pressure differential supplied a metering valve to attenuate the changes and thereby maintain the operational pressure differential within a predetermined range.

Pressure regulators such as disclosed in U.S. Pat. Nos. 3,463,182; 3,920,040 and 4,836,089 are designed to maintain a substantially constant pressure drop across a valve arrangement. The structure disclosed in U.S. Pat. No. 4,836,089 operates in an adequate manner, however the cost of manufacturing the structural components has resulted in limited acceptance by customers.

The present invention discloses a relative low cost regulator valve which has a first stage spool valve which reacts to changes in an operational pressure differential and a second stage spool member which reacts to the operation of the first stage spool valve to accurately regulate the operational pressure differential for a metering valve. The regulator valve has a housing with a cavity therein separated from a bore by wall. The wall has a passageway for connecting the cavity with bore. A diaphragm separates the cavity into a first chamber and a second chamber. The first chamber is connected to a first port for receiving operational fluid pressure while the second chamber is connected to a second port for receiving supply fluid pressure. A first spool attached to the diaphragm is urged toward a stop by a first spring to seal the passageway in the wall and prevent communication of supply fluid pressure from the second chamber. A second spool having a first land separated from a second land is located in the bore to define a third chamber and a fourth chamber within the housing. The third chamber is connected to the second chamber by the passageway in the wall while the fourth chamber is connected through a fifth port to a reservoir. The second spool has a passage with a restriction therein for connecting the third chamber to the fourth chamber. A second spring urges the second spool toward an adjustable stop located in the third chamber to move the second land past the fourth port and prevent the flow of supply fluid pressure from a third port through the groove to the fourth port. The diaphragm responds to changes in the operational pressure differential caused by an increase in the supply fluid pressure as presented to the second chamber. The increase in the operational fluid pressure differential acts on the diaphragm, by overcoming the first spring and moving the first spool away from the stop in the wall to allow supply fluid to be communicated through the passageway into the third cheer. The fluid pressure of the supply fluid present in the third cheer and a reference fluid pressure in the fourth chamber create a regulator fluid pressure differential. The regulator fluid pressure differential acts on the second spool to overcome the second spring and move the second land to allow supply fluid to be communicated through the groove to the fourth port. The fourth port, which is connected to a reservoir having a reference fluid pressure substantially equal to the surrounding environment, allows supply fluid to freely flow from the groove. The flow of supply fluid through the fourth port lowers the supply fluid pressure which is immediately communicated to the second chamber where the desired operational pressure differential is reestablished across the diaphragm. With the desired operational fluid pressure reestablished, the first spring moves the first spool into engagement with the stop in the wall and terminates the flow of supply fluid through the passageway into the third chamber. Supply fluid present in the third chamber is continually being communicated through the passage in the second spool to the fourth chamber and as a result the regulator fluid pressure differential is continually changing. After the termination of the flow of supply fluid into the third chamber, the regulator pressure differential is rapidly reduced and at some point, the second spring overcomes the force created by the regulator pressure differential to reposition the second land on the second spool to terminate the flow of supply fluid through the fourth port. With the flow of supply fluid through the groove terminated, the supply fluid pressure and the operational fluid pressure differential across the diaphragm remain substantially constant at a desired level. By sizing the relationship of the diaphragm associated with the first spool and second spool combination, large control forces can be generated from small changes in operational differential pressures to minimize frictional effects on the structure and ensure accurate and repeatable regulation of fuel supplied to a metering valve.

It is an object of this invention to provide a system with a regulator valve having a first spool valve responsive to an operational fluid pressure differential across a diaphragm to control the flow of supply fluid to a spool valve and the creation of a regulator pressure differential across a second spool to retain a supply fluid pressure within a predetermined range to maintains the operational fluid pressure substantially constant.

It is a further object of this invention to provide a fuel system with a two stage spool valve to control an operational fluid pressure differential for a metering valve.

Figure 2:
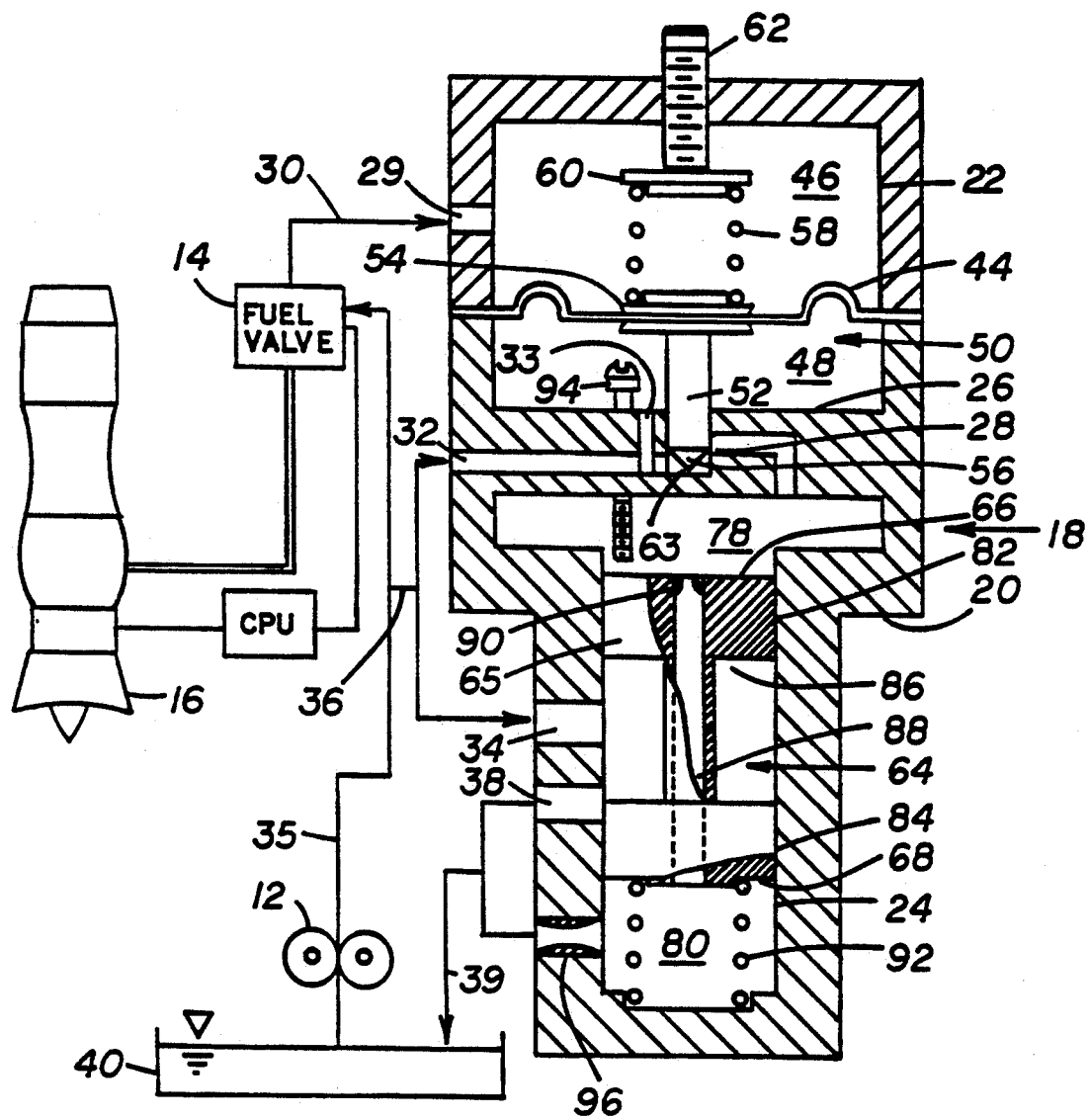

These objects and other advantages should be apparent from reading this specification while viewing the drawings wherein:

FIG. 1 is a schematic illustration of a fuel system having a regulator valve which incorporates the present invention to control an differential pressure for controlling a metering valve; and FIG. 2 is a schematic illustration of the regulator valve of FIG. 1 wherein a diaphragm associated with a first spool valve has responded to a change in the operational pressure differential to allow supply fluid to create a regulator pressure differential across a second spool valve sufficient to move the second spool valve and permit flow communication of the supply fluid to a reservoir to lower the fluid pressure in the supply fluid and return the operational pressure to a desired level.

The fuel system 10 shown in FIG. 1 has a high pressure pump 12 which supplies fluid to a metering valve 14, of a type disclosed in U.S. Pat. No. 4,835,969, for operating a turbine engine 16 in response to a operator input. Since the fuel requirement of the turbine can vary with the operator input it is necessary to provide a regulator valve 18 to maintain a smooth operation of all the component.

The regulator valve 18 has a housing 20 with a cavity 22 therein separated from a bore 24 by a wall 26. The wall 26 has an passageway 28 through which cavity 22 is connected with bore 24. The housing 20 has a first port 29 connected to receive operational fluid from the metering valve 14 through conduit 30, second 32 and third 34 ports connected to receive supply fluid from pump 12 through conduit 36 and fourth 38 and fifth 42 ports connected by conduit 39 to a supply reservoir 40 of pump 12. A first spool valve 50 which is located in cavity 22 forms a first stage while a second spool valve 64 which is located in bore 24 forms a second stage to control the regulation of the fluid pressure of the supply fluid.

The first spool valve 50 has a diaphragm 44 secured to housing 20 separates cavity 22 into a first chamber 46 and a second chamber 48 and a stem 52 with a base 54 attached to diaphragm 44. The stem 52 has a conical end or face 56 that is aligned in opening 28 in wall 26. A first spring 58 has an end located on base 54 of stem 52 and a second end on retainer member 60 of adjustable screw 62 that extends through housing 20. Spring 58 acts on and urges stem 52 toward a stop 63 in wall 26 to prevent communication of supply fluid from port 32 through passageway 28 to chamber 78 into bore 24. The fluid pressure of the operational fluid presented to chamber 46 through the first port 29 is substantially constant while the fluid pressure of the supply fluid from pump 12 as perceived in chamber 48 through port 32 and passageway 33 can vary in accordance with a current demand to operate the turbine 16. As long as the pressure differential created between operational fluid in the first chamber 46 and supply fluid in the second 48 chamber remains at a predetermined level, spring 58 retains face 56 into engagement with stop 63 to prevent the flow of supply fluid through passageway 28 to chamber 78. The diaphragm 44 with stem 52 attached thereto responds to changes in the supply fluid pressure by overcoming the force of spring 58 and moving face 56 of first spool member 50 from stop 63 and allow supply fluid to proportionally flow through passageway 28 into bore 24.

The second spool valve 64 has a cylindrical body 65 with a first end 66 and a second end 68 located in bore 24. End 66 and housing 20 cooperate to define chamber 78 in bore 24 to receive supply fluid from port 32 through passageway 28 while end 68 and housing 20 cooperated to define an ambient pressure (tank pressure) chamber 80 in bore 24. Cylindrical body 65 has a first land 82 thereon adjacent end 66, a second land 84 thereon adjacent end 68, and an annular groove 86 that separates the first 82 and second 84 lands. A passage 88 which is located in cylindrical body 65 connects chamber 78 with chamber 80. A first restriction 90 in passage 88 controls flow communication of fluid from chamber 78 to chamber 80 while a second restriction 96 located in port 42 controls the communication of fluid from chamber 80 to reservoir 40 by way of conduit 39. A spring 92 located in bore 24 acts on cylindrical body 65 to urge end 66 into engagement with adjustable stop 94 that extends through wall 26. The engagement of end 66 with stop 94 sets the closure position of land 84 with respect to port 38 to prevent fluid from flowing from port 34 to reservoir 40 by way of groove 86. With chamber 80 connected to reservoir 40 by way of restriction 96 in port 42 and conduit 39, spring 92 retains cylindrical member 65 in the rest portion as shown in FIG. 1.

All changes the fluid pressure of the supply fluid from pump 12 are communicated by conduit 36 to port 32 and passage 33 to chamber 48 in the regulator valve 18. Change in the fluid pressure of the supply fluid creates a corresponding change in the operational pressure differential across diaphragm 44. When a change in the operational pressure differential across diaphragm 44 is sufficient to overcome spring 58, a force is produced which moves the diaphragm 44 and correspondingly moves face 56 on stem 52 away from stop 63 to allow supply fluid to proportionally flow through passageway 28 into chamber 78 as illustrated in FIG. 2. With supply fluid in chamber 78, a regulator fluid pressure differential is created with fluid in chamber 80 which is substantially at the fluid pressure of the surrounding environment or reservoir 40. The regulator fluid pressure differential acts on face 66 to overcome spring 92 and move land 84 such that supply fluid flows from port 34 to reservoir 40 by way of bore 24, groove 86, port 38 and conduit 39. The flow of supply fluid through port 38 to reservoir 40 causes the fluid pressure therein to change or to be lowered such that the desired operational pressure differential is again reestablished and spring 58 reposition face 56 on stem 52 against stop 63 to terminate the flow supply fluid from port 32 to chamber 78 through passageway 28. Supply fluid that is presented to chamber 78 is communicated to chamber 80 by way of passage 88 as modified by restrictor 90 to continually or sequentially attenuate the regulator pressure differential modify the regulator pressure differential acting on cylindrical body 65. The restrictor 90 assures that movement of the cylindrical body 65 within bore 24 is smooth. At some desired closure pressure, spring 92 again moves cylindrical body 65 into engagement with stop 94 to reposition land 84 with respect to port 38 to terminate the flow of supply fluid through port 38 and thereby maintain the established fluid pressure in the supply fluid at a substantially constant desired level.

I claim:

1. In a fuel supply system having a regulator valve for controlling a supply fluid pressure communicated to a metering valve responsive to an operational pressure differential created between the supply fluid pressure and an operational fluid pressure, said regulator valve being responsive to said operational pressure differential for maintaining said supply fluid pressure within a predetermined fluid pressure range, said regulator valve comprising:

- a housing having a cavity therein separated from a bore by wall, said wall having a passageway therein through which said cavity is connected to said bore, said housing having a first port connected to receive said operational fluid pressure, second and third ports connected to receive said supply fluid pressure and fourth and fifth ports connected to a reservoir having a reference fluid pressure substantially equal to the surrounding environment;
- first spool means having a diaphragm for separating said cavity into a first chamber and a second chamber and a stem attached to said diaphragm, said first chamber being connected to said first port to receive said operational fluid pressure and said second chamber being connected to said second port to receive said supply fluid pressure;
- first resilient means acting on said diaphragm for positioning said stem in said wall to prevent communication of said supply fluid through said passageway;
- second spool means located in said bore to define a third chamber and a fourth chamber within said housing, said second spool means having a cylindrical body with first end and a second end, said cylindrical body having a first land and second land separated by a groove, said cylindrical body having a passage for connecting said third chamber with said fourth chamber; and second resilient means for urging said second spool means toward said third chamber to position said second land and prevent communication of said supply fluid pressure through said fourth port while allowing free communication of said supply fluid pressure from said third port to said groove and through said second port into said second chamber, said diaphragm responding to a change in said operational pressure differential caused by an increase in said supply fluid pressure as presented to said second chamber by overcoming said first resilient means and moving said stem in said wall to allow supply fluid pressure to be communicated through said passageway to said third chamber, said supply fluid pressure present in said third chamber creating a regulator fluid pressure differential with said reference fluid pressure in said fourth chamber, said regulator fluid pressure differential acting on said second spool means to overcome second resilient means and move said second land to allow supply fluid to freely flow from said third port to said fourth port through said groove to sequentially lower said supply fluid pressure and reestablish said operational pressure differential across said diaphragm means, said first resilient means opposing said operational fluid pressure differential to again move said stem in said wall to terminate communication of supply fluid pressure though said passageway into said third chamber, said supply fluid pressure present in said third chamber being communicated through said passage in said cylindrical body to said fourth chamber to sequentially reduce said regulator fluid pressure differential and thereafter allow said second resilient means to reposition said second land on said cylindrical body to terminate the flow of supply fluid through said fourth port and thereby maintain said operational fluid pressure differential at a desired level.

2. In the system as recited in claim 1 wherein said regulator valve further includes:
a restrictor located in said passage of said cylindrical body to control the flow of supply fluid pressure from said third chamber toward said fourth chamber to stabilize the movement of said cylindrical body by said regulator fluid pressure differential.

3. In the system as recited in claim 2 wherein said regulator valve further includes:
stop means located in said third chamber for engaging said cylindrical body to limit the movement thereof by said second resilient means and thereby set the position of said second land with respect to said fourth port.

4. In the system as recited in claim 3 wherein said stop means further includes:
first adjustment means extending through said wall for defining a rest position for said cylindrical body whereby said second land interrupts communication from said groove to said fourth port.

5. In the system as recited in claim 4 further including:
second adjustment means for positioning said first resilient means to assure that said stem is located in said wall to prevent communication through said passageway whenever a desired operational fluid pressure differential is created across said diaphragm.

* * * * *